(12) United States Patent
Jung et al.

(10) Patent No.: US 8,452,033 B2
(45) Date of Patent: May 28, 2013

(54) INFORMATION STORAGE MEDIUM STORING GRAPHIC DATA AND APPARATUS AND METHOD OF PROCESSING THE GRAPHIC DATA

(75) Inventors: Kil-soo Jung, Osan-si (KR); Seong-jin Moon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1253 days.

(21) Appl. No.: 12/179,974

(22) Filed: Jul. 25, 2008

(65) Prior Publication Data
US 2008/0278501 A1 Nov. 13, 2008

Related U.S. Application Data

(63) Continuation of application No. 10/890,212, filed on Jul. 14, 2004, now Pat. No. 7,567,710.

(60) Provisional application No. 60/511,110, filed on Oct. 15, 2003.

(30) Foreign Application Priority Data

Jul. 31, 2003 (KR) .................................. 2003-53073

(51) Int. Cl.
*G06K 9/54* (2006.01)
*G06K 9/36* (2006.01)

(52) U.S. Cl.
USPC ............................ 381/305; 382/180; 382/233

(58) Field of Classification Search
USPC ............ 382/180, 232, 233, 236, 305; 386/69, 386/95, 96, 124, 125; 709/231; 345/418, 345/501, 530, 536
See application file for complete search history.

(56) References Cited

U.S. PATENT DOCUMENTS

| 4,814,756 | A | 3/1989 | Chauvel |
| 6,408,338 | B1 | 6/2002 | Moon et al. |
| 6,522,616 | B1 | 2/2003 | Magnitski et al. |
| 6,563,999 | B1 | 5/2003 | Suzuoki |

(Continued)

FOREIGN PATENT DOCUMENTS

| CN | 1816866 A | 8/2006 |
| EP | 0 763 296 A1 | 3/1997 |

(Continued)

OTHER PUBLICATIONS

Chinese Office Action issued on Oct. 19, 2011, in counterpart Chinese Application No. 200710108572.1 (9 pages, in Chinese, including complete English translation).

(Continued)

*Primary Examiner* — Duy M Dang
(74) *Attorney, Agent, or Firm* — NSIP Law

(57) ABSTRACT

An information storage medium including graphic data and presentation information, and an apparatus and method of processing the graphic data are provided. The information storage medium includes the graphic data, page composition information which defines page composition of the graphic data, and the presentation information indicating when graphic screen data, which is composed with reference to the page composition information of the graphic data, is output to a display screen. Therefore, a graphic object is reusable in graphic data processing, and accordingly, a time taken to process the graphic data is reducible and memory area may be saved.

2 Claims, 8 Drawing Sheets

U.S. PATENT DOCUMENTS

| | | | |
|---|---|---|---|
| 6,618,507 B1 | 9/2003 | Divakaran et al. | |
| 7,760,989 B2 | 7/2010 | Seo et al. | |
| 7,945,124 B2 * | 5/2011 | Jung et al. | 382/305 |
| 2002/0186485 A1 | 12/2002 | Cho et al. | |
| 2003/0058252 A1 | 3/2003 | Matsuda et al. | |
| 2006/0288302 A1 | 12/2006 | Yahata et al. | |

FOREIGN PATENT DOCUMENTS

| | | |
|---|---|---|
| EP | 1 102 237 A1 | 5/2001 |
| JP | 08-163560 | 6/1996 |
| JP | 10-285047 | 10/1998 |
| JP | 11-296535 A | 10/1999 |
| JP | 2002-044590 | 2/2002 |
| JP | 2002-153678 A | 5/2002 |
| JP | 2007-534182 A | 11/2007 |
| KR | 10-0217742 B1 | 9/1999 |
| KR | 10-2000-0002691 A | 1/2000 |
| KR | 2000-2690 | 1/2000 |
| KR | 2000-11118 | 2/2000 |
| KR | 2001-42737 | 5/2001 |
| KR | 2002-52190 | 7/2002 |
| WO | WO 96/31033 A2 | 10/1996 |
| WO | WO 99/17258 | 4/1999 |
| WO | WO 2005/002220 | 1/2005 |
| WO | WO 2005/006747 A1 | 1/2005 |

OTHER PUBLICATIONS

International Search Report issued on Dec. 1, 2004, in International Application No. PCT/KR2004/001761 (in English).
Written Opinion of the International Searching Authority issued on Dec. 1, 2004, in International Application No. PCT/KR2004/001761 (in English).
U.S. Appl. No. 13/364,471, filed Feb. 2, 2012, Kil-soo Jung, et al., Samsung Electronics Co., Ltd.
U.S. Appl. No. 13/364,511, filed Feb. 2, 2012, Kil-soo Jung, et al., Samsung Electronics Co., Ltd.
Canadian Office Action issued on Nov. 25, 2009, in corresponding Canadian Application No. 2,515,187 (3 pages).
Malaysian Office Action issued on Mar. 31, 2011, in counterpart Malaysian Application No. PI 20081149 (3 pages, in English).
Singapore Office Action issued on May 20, 2011, in counterpart Singapore Application No. 200803085-0 (13 pages, in English).
U.S. Appl. No. 10/890,212, filed Jul. 14, 2004, Kil-soo Jung et al., Samsung Electronics Co., Ltd.
U.S. Appl. No. 12/179,810, filed Jul. 25, 2008, Kil-soo Jung et al., Samsung Electronics Co., Ltd.
U.S. Appl. No. 12/179,822, filed Jul. 25, 2008, Kil-soo Jung et al., Samsung Electronics Co., Ltd.
U.S. Appl. No. 12/179,836, filed Jul. 25, 2008, Kil-soo Jung et al., Samsung Electronics Co., Ltd.
U.S. Appl. No. 12/179,848, filed Jul. 25, 2008, Kil-soo Jung et al., Samsung Electronics Co., Ltd.
U.S. Appl. No. 12/179,864, filed Jul. 25, 2008, Kil-soo Jung et al., Samsung Electronics Co., Ltd.
U.S. Appl. No. 12/179,966, filed Jul. 25, 2008, Kil-soo Jung et al., Samsung Electronics Co., Ltd.
U.S. Appl. No. 12/179,990, filed Jul. 25, 2008 Kil-soo Jung et al., Samsung Electronics Co., Ltd.
U.S. Appl. No. 12/180,638, filed Jul. 28, 2008, Kil-soo Jung et al., Samsung Electronics Co., Ltd.
U.S. Appl. No. 12/180,642, filed Jul. 28, 2008, Kil-soo Jung et al., Samsung Electronics Co., Ltd.
U.S. Appl. No. 12/180,645, filed Jul. 28, 2008, Kil-soo Jung et al., Samsung Electronics Co., Ltd.
U.S. Appl. No. 12/180,654, filed Jul. 28, 2008, Kil-soo Jung et al., Samsung Electronics Co., Ltd.
U.S. Appl. No. 12/180,656, filed Jul. 28, 2008, Kil-soo Jung et al., Samsung Electronics Co., Ltd.
U.S. Appl. No. 12/180,662, filed Jul. 28, 2008, Kil-soo Jung et al., Samsung Electronics Co., Ltd.
U.S. Appl. No. 12/180,665, filed Jul. 28, 2008, Kil-soo Jung et al., Samsung Electronics Co., Ltd.
Japanese Office Action issued on Jun. 15, 2010, in corresponding Japanese Application No. 2006-521779 (4 pages).
Japanese Office Action issued on Jul. 5, 2011, in counterpart Japanese Application No. 2008-133962 (1 page, in Japanese, no English translation).
Japanese Office Action issued on Jul. 5, 2011, in counterpart Japanese Application No. 2008-133963 (2 pages, in Japanese, no English translation).
Mexican Office Action issued on Jul. 20, 2011, in counterpart Mexican Application No. MX/a/2008/005758 (3 pages, in Spanish, no English translation).
Korean Office Action issued on May 31, 2007, in counterpart Korean Application No. 10-2003-0053073 (5 pages, in Korean, including complete English translation of p. 1).
European Office Action issued Sep. 6, 2012, in counterpart European Application No. 04 774 131.9 (9 pages, in English).
Chinese Office Action issued Mar. 31, 2012 in counterpart Chinese Patent Application No. 201010530712.6 (9 pages with English language translation).
Barron, K.E., "Normative Composition: Problem definition and initial thoughts," International Organisation for Standardisation (ISO/IEC JTC1/SC29/WG11; Coding of Moving Pictures and Audio), Feb. 1998, 4pp, No. M3193 (sections 1 and 3).
"Digital Video Broadcasting (DVB); Subtitling Systems," ETSI EN 300 743 (European Standard (Telecommunications Series)), Oct. 1, 2002, pp. 1-48, vol. BC, No. V1.2.1.
Foley, J. D., et al., "18.1.3 Increasing Frame-Buffer Memory Bandwidth," Computer Graphics, Principles and Practice, Jan. 1, 1996, 88pp.
"MPEG-2, Systems Part," Feb. 1, 2000, 2$^{nd}$ Edition, No. 13818-1, 84 pp (Sections 2.1.14 and 2.1.39).
Puri, Atul, et al., "Overview of the MPEG Standards," Multimedia Systems, Standards, and Networks, Mar. 22, 2000, 44pp, Section IV.B: "MPEG-4 Systems", CRC Press.
Extended European Search Report issued Jun. 11, 2012, in counterpart European Application No. 08155919.7 (7pp).
Extended European Search Report issued Jun. 11, 2012, in counterpart European Application No. 08155920.5 (6pp).
Japanese Office Action issued Jun. 26, 2012, in counterpart Japanese Application No. 2008-133962 (1pg).
Japanese Office Action issued Jun. 26, 2012, in counterpart Japanese Application No. 2008-133963 (1pg).
Supplementary Partial European Search Report issued Jun. 25, 2012, in counterpart European Application No. 04774131.9 (4pp).
J. Foley et al., "18.1.3 Increasing Frame-Buffer Memory Bandwidth," *Computer Graphics: Principles and Practice*, 2nd edition, pp. 858-859, 1990, Addison-Wesley, Reading, MA, ISBN 0201121107.
*MPEG-2, systems part, 2nd edition*, ITU-T Recommendation H.222.0 (2000 E), ISO/IEC 13818-1:2000(E), Feb. 2000, entire document, particularly sections 2.1.14 and 2.1.39.
Canadian Office Action dated Dec. 4, 2012, issued in counterpart Canadian Application No. 2,515,187 (3 pages, in English).

* cited by examiner

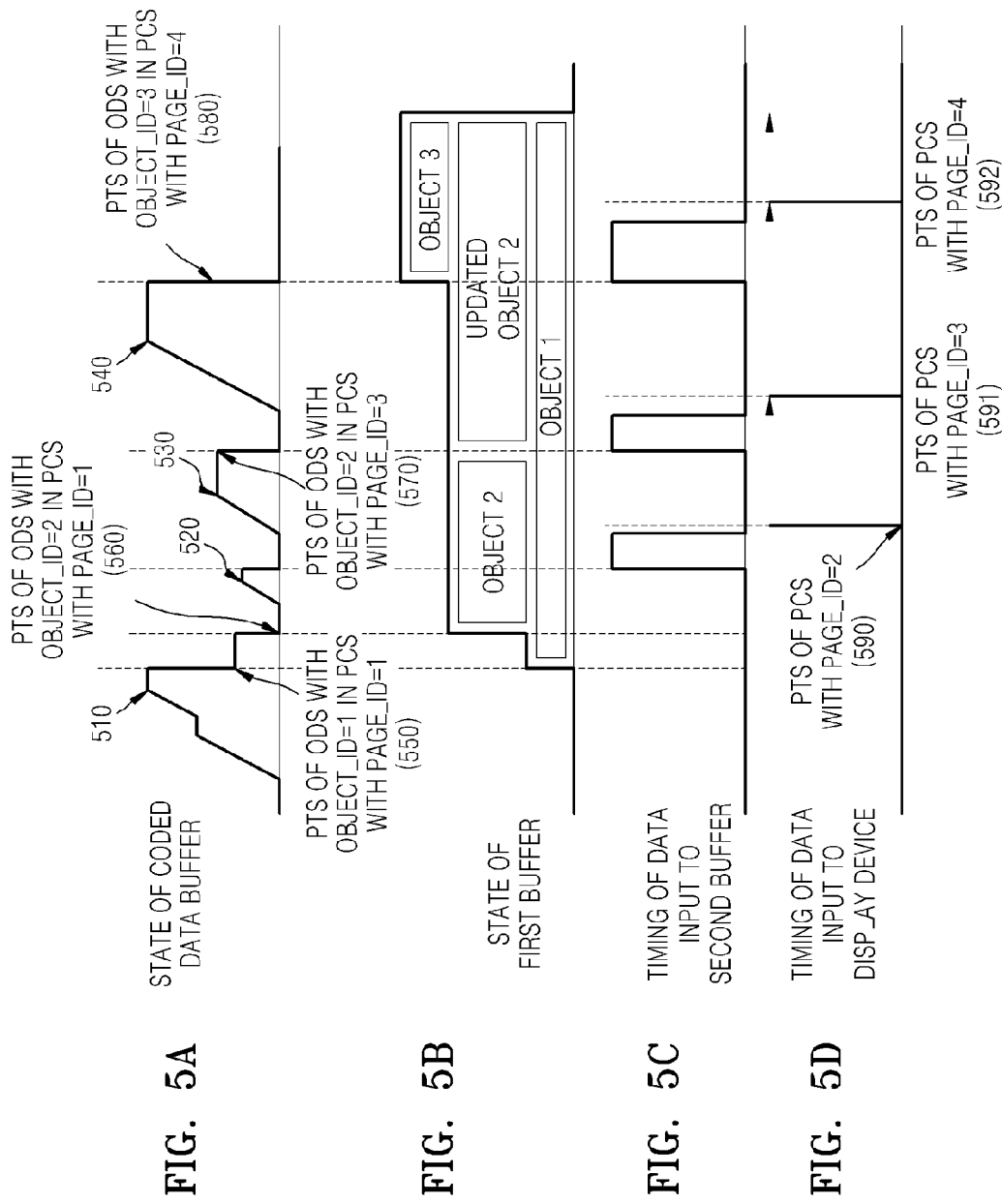

INFORMATION STORAGE MEDIUM STORING GRAPHIC DATA AND APPARATUS AND METHOD OF PROCESSING THE GRAPHIC DATA

CROSS-REFERENCE TO RELATED APPLICATIONS

This application is a continuation of application Ser. No. 10/890,212 filed on Jul. 14, 2004, now U.S. Pat. No. 7,567,710 issued on Jul. 28, 2009, which claims the benefit of Korean Patent Application No. 2003-53073 filed on Jul. 31, 2003, in the Korean Intellectual Property Office, and U.S. Provisional Application No. 60/511,110 filed on Oct. 15, 2003, now expired. The disclosures of application Ser. No. 10/890,212, Korean Patent Application No. 2003-53073, and U.S. Provisional Application No. 60/511,110 are incorporated herein by reference in their entirety.

BACKGROUND OF THE INVENTION

1. Field of the Invention

The present invention relates to graphic data processing, and more particularly, to an information storage medium including graphic data having presentation information, and an apparatus and method of processing the graphic data.

2. Description of the Related Art

Various data compression formats are used to transmit video and audio data through broadcasting or store the video and audio data in a storage medium. Among the data compression formats, Moving Picture Experts Group (MPEG)-2 transport stream (TS) multiplexes and stores video and audio data by dividing the video and audio data into packets having a predetermined size. Since graphic data, as well as video data, is displayed on a screen, the MPEG-2 TS stored in an information storage medium includes the graphic data. The graphic data roughly comprises subtitle graphic data and navigation graphic data.

The graphic data included in the MPEG-2 TS is decoded in a graphic data processing apparatus and output to a display screen. In addition to the graphic data, the MPEG-2 TS stored in the information storage medium also includes time information indicating when the graphic data is to be transmitted to a variety of buffers disposed inside the graphic data processing apparatus, and time information indicating when the graphic data of a completely composed screen is to be output to the display screen. Times indicated by the time information should be properly set so that graphic data processing may be performed efficiently. Further, a configuration of the buffers in the graphic data processing apparatus determines an efficiency of the graphic data processing apparatus. A conventional graphic data processing apparatus has a disadvantage in that the graphic data processing apparatus cannot reuse a graphic object of which a graphic screen is composed, thereby deteriorating the efficiency in the graphic data processing.

SUMMARY OF THE INVENTION

The present invention provides an information storage medium including graphic data that newly defines presentation information included therein to improve an efficiency in graphic data processing, and an apparatus and method of processing the graphic data.

Additional aspects and/or advantages of the invention will be set forth in part in the description which follows and, in part, will be obvious from the description, or may be learned by practice of the invention.

According to an aspect, an information storage medium is provided comprising: graphic data; page composition information which describes a page composition of the graphic data; and presentation information indicating when graphic screen data, which is composed with reference to the page composition information of the graphic data, is output to a display screen.

According to another aspect, an information storage medium is provided comprising: a graphic object to be used to compose graphic screen data; and presentation information indicating when the graphic object is to be decoded and output or when the graphic object is to be input to a decoder.

According to another aspect, an information storage medium is provided comprising graphic data having a structure thereof which includes a display set comprising: a page composition segment which includes information on a composition of a graphic screen and a first presentation time stamp value; an object display segment which includes a graphic object of which the graphic screen is composed, information about a size of the graphic object, and a second presentation time stamp value; and an end segment which indicates an end of the display set, wherein a first presentation time stamp value indicates when graphic screen data composing the page composition segment and the object display segment are output to a display device.

According to another aspect, an information storage medium is provided comprising graphic data having a structure thereof which includes a display set comprising: a page composition segment which includes information on a composition of a graphic screen and a first presentation time stamp value; an object display segment which includes a graphic object of which the graphic screen is composed, information about a size of the graphic object, and a second presentation time stamp value; and an end segment which indicates an end of the display set, wherein a second presentation time stamp value indicates when the graphic object is decoded and output.

According to another aspect, an apparatus for processing graphic data is provided, the apparatus comprising: a first buffer which distinguishes decoded graphic object data by identifiers of graphic objects and stores the distinguished graphic object data; and a second buffer which receives a graphic object used in a screen composition among the graphic object data stored in the first buffer and stores graphic screen information composed with reference to page composition information.

According to still another aspect, an apparatus for processing graphic data is provided, the apparatus comprising: a coded data buffer which receives and stores coded graphic data and outputs the coded graphic data according to presentation information included in the graphic data; a decoder which decodes the coded graphic data; a page composition buffer which stores page composition information among the decoded graphic data; a first buffer which stores objects of the decoded graphic data by graphic object identifiers; a second buffer which receives a graphic object used in a screen composition among the graphic objects stored in the first buffer and stores graphic screen information composed with reference to the page composition information; and an image controller which receives the page composition information stored in the page composition buffer and controls the graphic objects to be transmitted from the first buffer to the second buffer.

According to another aspect, a method of processing graphic data is provided, the method comprising: receiving the graphic data; receiving page composition information which describes a page composition of the graphic data; and outputting graphic screen data, which is composed with reference to the page composition information of the graphic data, to a display screen according to presentation information indicating a time when graphic screen data is output to the display screen.

According to another aspect, a method of processing graphic data is provided, the method comprising: receiving a graphic object to be used to compose graphic screen data; and outputting a decoded graphic object according to presentation information indicating when the graphic object is to be decoded and output or when the graphic data is to be input to a decoder.

BRIEF DESCRIPTION OF THE DRAWINGS

These and/or other aspects and advantages of the invention will become apparent and more readily appreciated from the following description of the embodiments, taken in conjunction with the accompanying drawings of which:

FIGS. 5A-5D are diagrams illustrating a process of inputting and outputting data to and from the buffers in accordance with a passage of time;

DETAILED DESCRIPTION OF THE EMBODIMENTS

Figure 1:
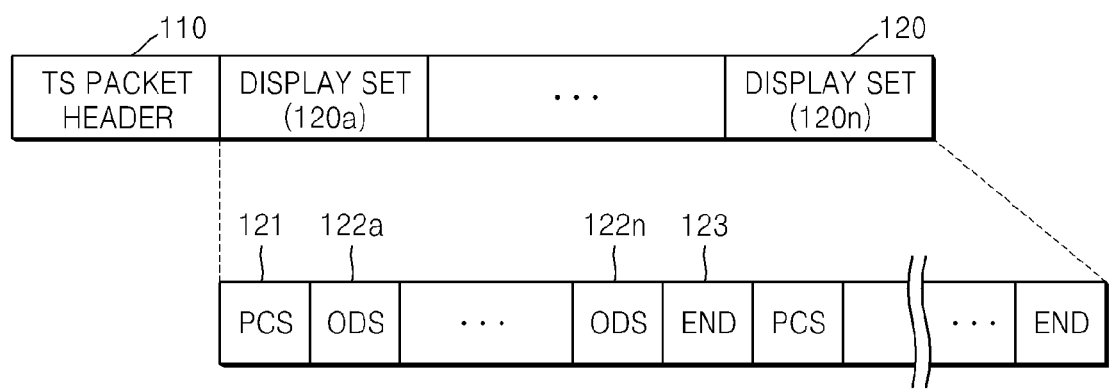
FIG. 1 is a diagram illustrating a structure of MPEG-2 TS for graphic data according to a first embodiment of the present invention.

Reference will now be made in detail to the embodiments of the present invention examples of which are illustrated in the accompanying drawings, wherein like reference numerals refer to the like elements throughout. The embodiments are described below to explain the present invention by referring to the figures.

Graphic data, which is displayed together with video data, is classified into subtitle graphic data and navigation graphic data. The subtitle graphic data is screen description data, such as superimposed dialogs, and the navigation graphic data is graphic data regarding menus, such as buttons used in navigating the video data.

A subtitle graphic data stream and a navigation graphic data stream are processed by different graphic data processing apparatuses in a video reproduction system. However, the graphic data processing apparatuses have a common configuration. The graphic data processing apparatuses process the subtitle graphic data stream and the navigation graphic data stream which are coded in a form of a motion picture experts group (MPEG)-2 transport stream (TS).

FIG. 1 is a diagram illustrating a structure of MPEG-2 TS for graphic data according to a first embodiment of the present invention.

Referring to FIG. 1, the graphic MPEG-2 TS includes a TS Packet header 110 and a data packet 120. The data packet 120 represents subtitle graphic data and navigation graphic data, and includes display sets 120a through 120n, which are graphic data groups displayed on one graphic screen.

The display set 120a, 120b . . . or 120n is a group of graphic data output to one display screen. Referring to FIG. 1, the display set 120a, 120b . . . or 120n includes at least two segments. That is, one display set must include a page composition segment (PCS) 121 and an end segment END 123. An object display segment (ODS) is optionally included in the display set 120a, 120b . . . or 120n, and a plurality of ODSs 122a through 122n may be included in the display set 120a, 120b . . . or 120n, if necessary. Each of the different segments will be explained in detail hereinbelow.

The PCS 121 includes composition information of the ODSs 122a through 122n displayed on one screen. That is, the PCS 121 includes position information indicating where objects are displayed on the screen and time information indicating when the objects are output to a display device. The time information is called presentation time stamp (PTS) information. Accordingly, the PCS 121 includes the PTS information. In an apparatus for processing graphic data which will be described with reference to FIG. 2, the PTS information indicates when graphic screen data, which is composed of the ODSs 122a through 122n necessary to compose one graphic screen, is output from a second buffer 234 to the display device.

The ODSs 122a through 122n include subtitle graphic object data and navigation graphic object data, and may contain size information, such as a width and a height, or color table information of a pertinent object. The size information and color table information will not be described in detail, but may be included in a separate segment of the display set 120a, 120b . . . or 120n. The ODSs 122a through 122n also include the PTS information thereof. The PTS information of the ODS 122 through 122n indicates when the ODSs 122a through 122n are stored in a first buffer 233 of the graphic data processing apparatus 230. The END 123 indicates the end of one display set 120a, 120b . . . or 120n.

Two types of presentation information exist. That is, when there are graphic data and page composition information which that defines a page composition of the graphic data, one type of presentation information indicates when graphic screen data composed with reference to the page composition information of the graphic data is to be output to the display screen. This type of presentation information is recorded in the page composition segment (PCS) 121 including the page composition information.

When there is a graphic object to be used to compose the graphic screen data, another type of presentation information indicates when the graphic object is to be decoded in a decoder and output. If a time taken to decode the graphic object in the decoder is 0, this type of presentation information may be considered to be information indicating when the graphic object is to be input to the decoder to be decoded.

Figure 2:
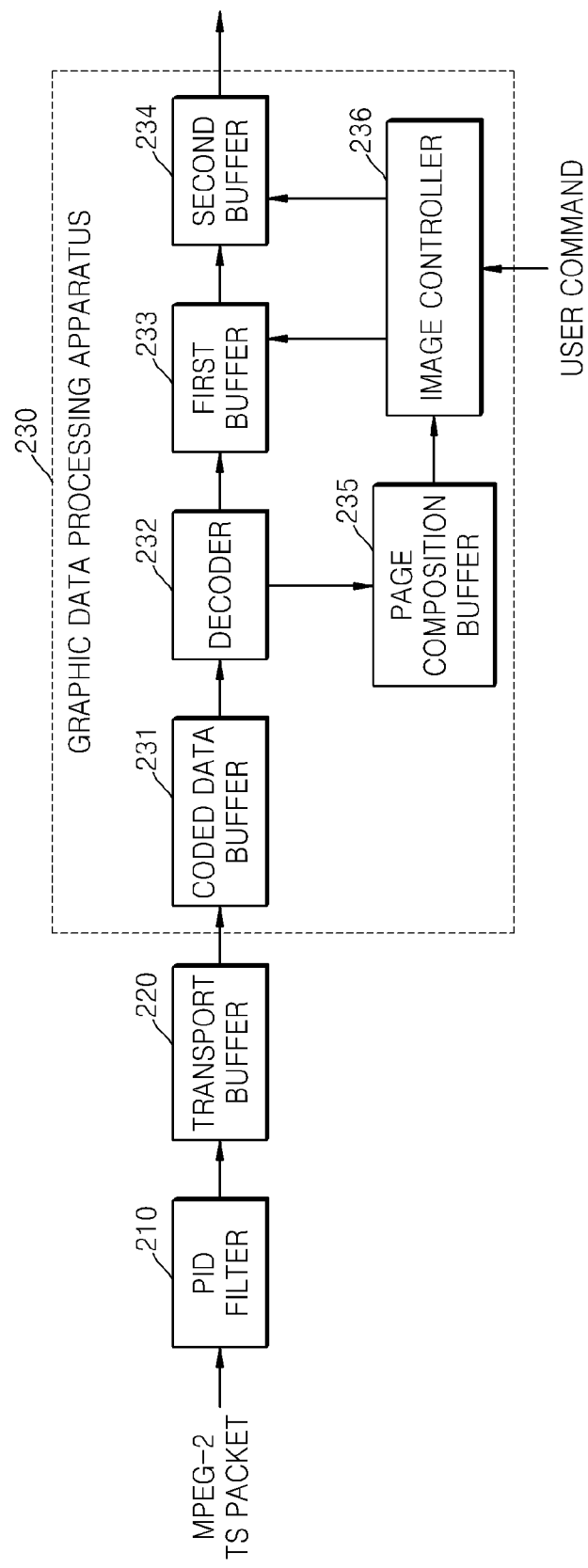
FIG. 2 is a block diagram of an apparatus for processing graphic data according to a second embodiment of the present invention.

FIG. 2 is a block diagram of a graphic data processing apparatus 230 for processing graphic data according to a second embodiment of the present invention.

The graphic data processing apparatus 230 includes a coded data buffer 231, a decoder 232, a first buffer 233, a second buffer 234, a page composition buffer 235 and an image controller 236.

The subtitle graphic stream and the navigation graphic stream, which are stored in a form of an MPEG-2 TS in the information storage medium, pass through a read buffer (not shown) and a source de-packetizer (not shown) in which an arrival time stamp (ATS) that had been added to the MPEG-2 TS is removed, and further, are input to a transport packet identifier (PID) filter 210 in the form of an MPEG-2 TS packet. Input timing of a first byte of the MPEG-2 TS packet input to the PID filter 210 is determined by ATS information contained in a first header of the MPEG-2 TS packet. Further MPEG-2 TS packets are input to the PID filter 210 according to a TS_recording_rate.

The PID filter 210 determines, with reference to a PID of the MPEG-2 TS packet, whether or not the input MPEG-2 TS packet has a desired PID value, and transmits MPEG-2 TS packets having the desired PID values to a transport buffer 220. Since buffering and delay do not theoretically occur in the PID filter 210, the MPEG-2 TS packets are output immediately after being input to the PID filter 210.

The transport buffer 220 receives an MPEG-2 TS packet having a specific PID value output from the PID filter 210. That is, the transport buffer 220 performs a queue operation to temporarily store the MPEG-2 TS packet before the MPEG-2 TS packet is input to the graphic data processing apparatus 230. Once the MPEG-2 TS packet is input to the transport buffer 220, a header of the MPEG-2 TS packet and a header of a Packetized Elementary Stream (PES) packet are removed. Further, referring to FIG. 1, the header 110 of the MPEG-2 TS packet for the subtitle graphic data and navigation graphic data includes PTS information. After the header of the MPEG-2 TS packet is removed, the PTS information indicates when the data packet 120, including of the display sets 120a, 120b... and 120n shown in FIG. 1, is input to the coded data buffer 231.

The coded data buffer 231 receives the subtitle graphic data stream and the navigation graphic data stream in a coded state and buffers the subtitle graphic data stream and the navigation graphic data stream that are to be processed in the graphic data processing apparatus 230. The subtitle graphic data stream and the navigation graphic data stream input to the coded data buffer 231 are output from the coded data buffer 231 according to the PTS information included in the ODS 122a through 122n.

The PTS information of the ODS 122a through 122n is, for example, information indicating when a storage of the ODS 122a through 122n in the first buffer 233 finishes, since an ideal decoding time of the graphic data in the decoder 232 is 0. That is, a time when the ODS 122a through 122n is output from the coded data buffer 231 is equal to a time when the ODS 122a through 122n is stored in the first buffer 233. The PTS information of the ODS 122a through 122n indicates not only the time when the ODS 122a through 122n is output from the coded data buffer 231, but also the time when the ODS 122a through 122n is stored in the first buffer 233 after being decoded. However, since it actually takes some time for the decoder 232 to decode the ODS 122a through 122n, the PTS information of two ODSs, for example, ODS 122a and 122b, have a predetermined time interval therebetween in consideration of a time required for the decoder 232 to decode a previous object.

The decoder 232 decodes the input subtitle graphic data and input navigation graphic data. After the input subtitle and input navigation graphic data are decoded, the decoded PCS 121 is output to the page composition buffer 235 and the decoded ODS 122a through 122n is output to the first buffer 233. Theoretically, a time taken to decode the input data in the decoder 232 is 0. Thus, the decoding operation is called an instant decoding operation.

The page composition buffer 235 stores the PCS 121 which is decoded and output from the decoder 232.

The first buffer 233 stores the ODS 122a through 122n, which are decoded in the decoder 232, according to respective object identifiers object_id of the ODS 122a through 122n. Since the decoded object data is stored in the first buffer 233, one object is reusable several times before the first buffer 233 is completely reset.

The second buffer 234 stores data right before graphic screen data of a screen, which is composed of graphic data objects necessary to display the subtitle graphic data and the navigation graphic data on the display device, is output. The data stored in the second buffer 234 is output to the display device according to the PTS information of the PCS 121 having page composition information of a pertinent page.

The image controller 236 controls, with reference to object identifiers (i.e., object_id), objects to be transmitted from the first buffer 233 to the second buffer 234 and to be displayed on one page. That is, the image controller 236 controls the first buffer 233 to select the graphic data object necessary to compose the pertinent page (i.e. screen), based on the page composition information of the PCS data output from the page composition buffer 235, and to transmit selected graphic data object from the first buffer 233 to the second buffer 234. The image controller 236 transmits the page composition information to the second buffer 234 to compose the display screen. Further, when the image controller 236 receives a user command from a user, the image controller 236 controls the above elements to select the subtitle graphic data and the navigation graphic data having a different PID and composes a display screen.

Figure 3:
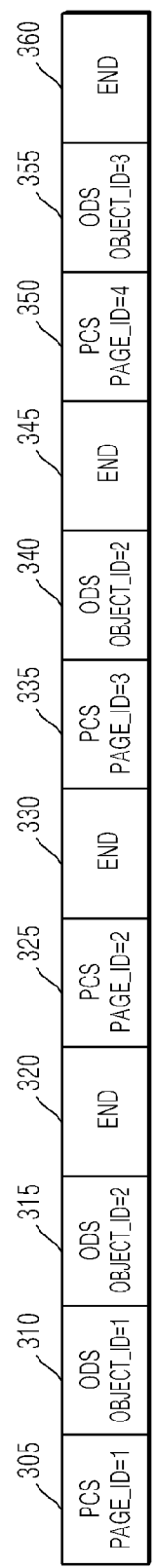
FIG. 3 is a diagram illustrating a third embodiment of the present invention of the graphic data.

FIG. 3 is a diagram illustrating a third embodiment of the present invention of graphic data.

An operation of processing the graphic data having display sets 120a through 120n in a graphic data processing apparatus 230 and displaying the processed graphic data on a display screen will be explained in detail with reference to FIG. 3.

Referring to FIG. 3, subtitle graphic data and navigation graphic data have four display sets 305 through 320, 325 through 330, 335 through 345, and 350 through 360. As an MPEG-2 TS including a plurality of display sets passes through the decoder 232, the subtitle graphic data and the navigation graphic data included in the ODS 122a through 122n is stored in the first buffer 233 and the page composition information contained in the PCS 121 is stored in the page composition buffer 235. Further, both the graphic data and the page composition information are transmitted to the second buffer 234 based on respective PTS information. The operation will be explained below. A header of each display set is not shown in FIG. 3 for convenience of description.

Figure 4A:
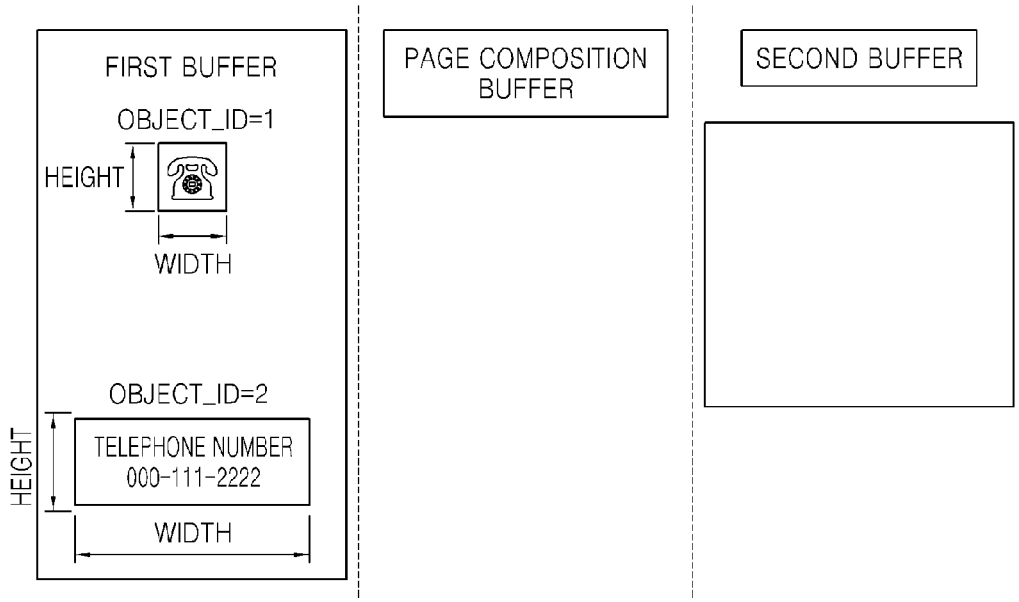
FIG. 4A is a diagram illustrating a state in which a first display set having a page composition segment (PCS) with a page_id=1 is stored in buffers.

FIG. 4A is a diagram illustrating a state in which a first display set 305 through 320 having a PCS 305 with a page_id=1 is stored in buffers.

Graphic data of an ODS 310 with an object_id=1 and graphic data of an ODS 315 with the object_id=2 are stored in the first buffer 233 at a time indicated by the PTS information included in the ODSs 310 and 315. At this time, no data is stored in the page composition buffer 235. In general, an instance where all object data stored in the first buffer 233 is no longer used and a new display set is input to the first buffer 233 to process new object data is called mode conversion. A first PCS input during mode conversion has no data or is a dummy PCS. Accordingly, a graphic data processing apparatus 230 decodes only necessary objects of the first display set 305 through 320 until a subsequent mode conversion and stores the necessary objects in the first buffer 233. Therefore, there is no data in the second buffer 234.

Figure 4B:
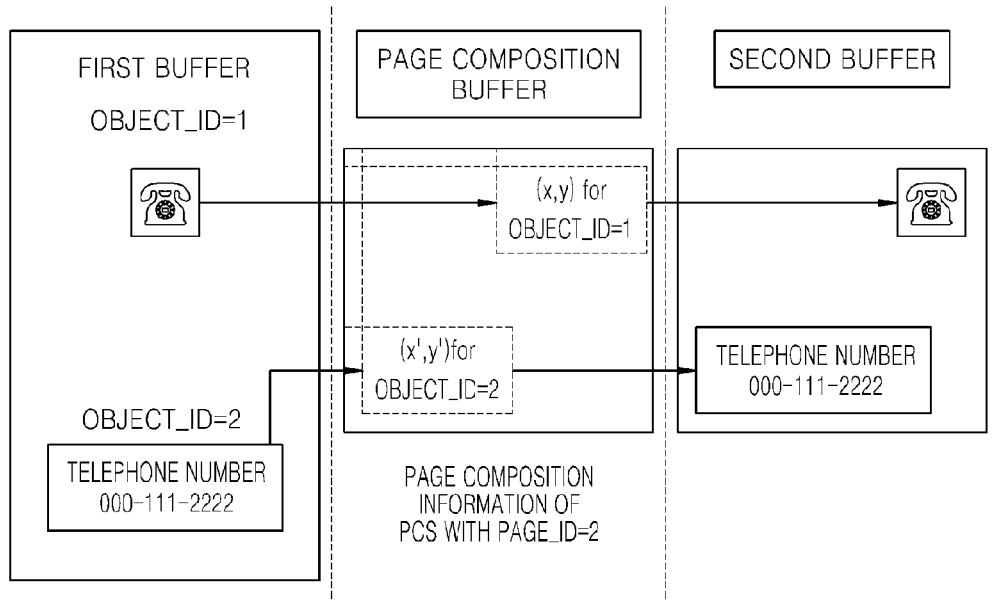
FIG. 4B is a diagram illustrating a state in which a second display set having the PCS with the page_id=2 is stored in the buffers.

FIG. 4B is a diagram illustrating a state in which a second display set 325 through 330 having a PCS 325 with the page_id=2 is stored in the buffers.

Referring to FIG. 3, the second display set 325 through 330 having the PCS 325 with the page_id=2 includes the PCS 325 and an END 330. The second display set 325 through 330 includes the page composition information to display the objects of the first display set 305 through 320 with the page_id=1 stored in the first buffer 233 on the display screen. Accordingly, the PCS 325 with the page_id=2 includes position information indicating which graphic objects are displayed and where the graphic objects are displayed on the display screen. The image controller 236 controls the first buffer 233 using the page composition information of the PCS 325 with the page_id=2 so that the graphic objects corresponding to the ODS 310 with the object_id=1 and the ODS 315 with the object_id=2 are transmitted to the second buffer 234 and the screen may be composed. At a time indicated by the PTS information included in the PCS 325, graphic screen data of a completely composed screen is output from the second buffer 234 to the display device.

Figure 4C:
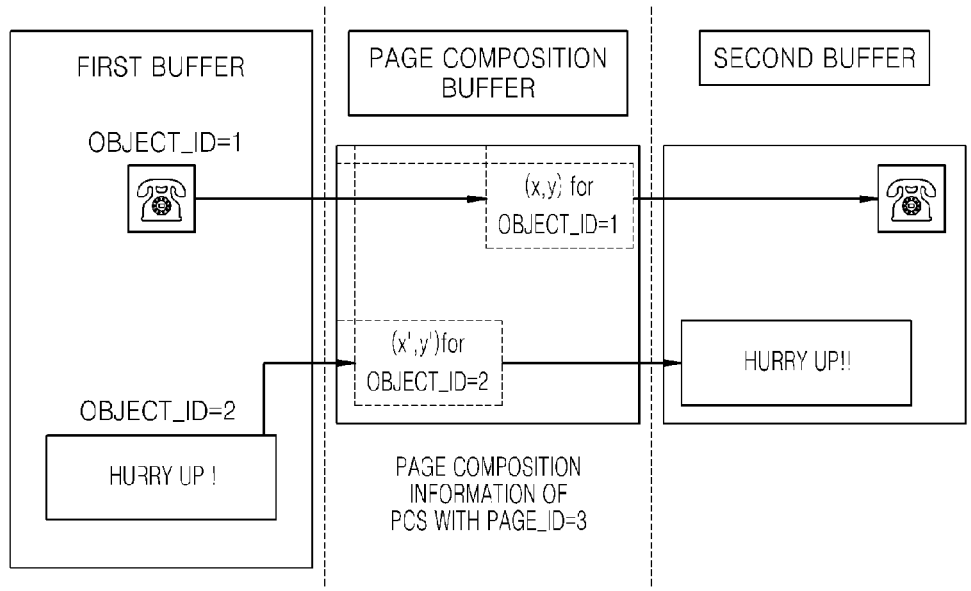
FIG. 4C is a diagram illustrating a state in which a third display set having the PCS with the page_id=3 is stored in the buffers.

FIG. 4C is a diagram illustrating a state in which a third display set 335 through 345 having a PCS 335 with the page_id=3 is stored in the buffers.

Referring to FIG. 3, the third display set 335 through 345 having the PCS 335 with the page_id=3 includes the PCS 335, an ODS 340 with the object_id=2, and an END 345. The ODS 340 included in the third display set 335 through 345 having the PCS 335 with the page_id=3 has the same object_id=2 as the ODS 315 of the ODSs 310 and 315 of the first display set 305 through 320 having the PCS 305 with the page_id=1. Since the ODS 340 having the same object_id=2 as the ODS 315 overlies the ODS 315, the ODS 340 consequently performs an update operation. That is, although the page composition information of the PCS does not change, an updated object is reflected on the display screen such that at a time indicated by PTS information of the pertinent PCS, graphic data, which is stored in the second buffer 234, of a completely composed screen is output to the display device.

Figure 4D:
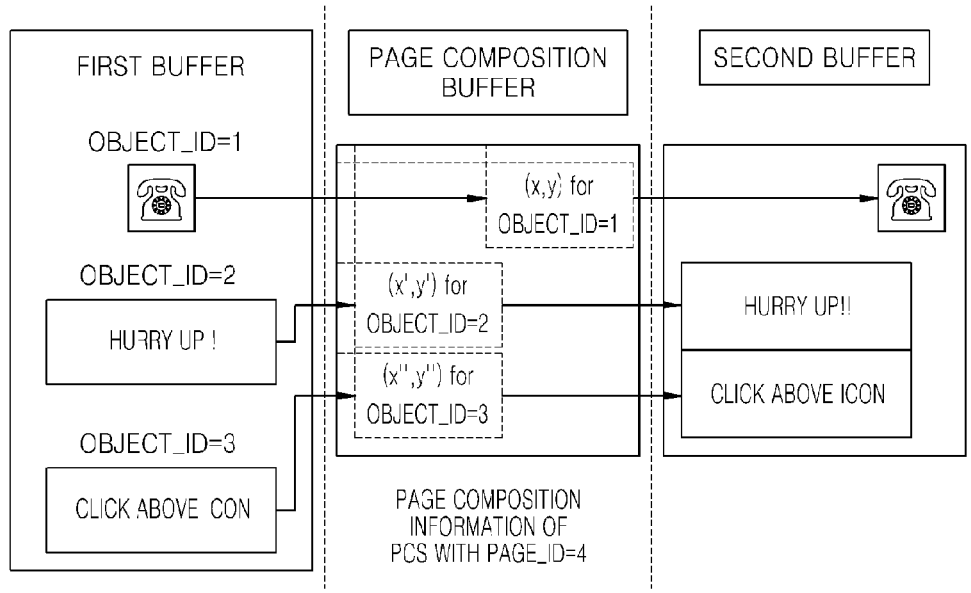
FIG. 4D is a diagram illustrating a state in which a fourth display set having the PCS with the page_id=4 is stored in the buffers.

FIG. 4D is a diagram illustrating a state in which a fourth display set 350 through 360 having a PCS 350 with the page_id=4 is stored in the buffers.

Referring to FIG. 3, the fourth display set 350 through 360 having the PCS 350 with the page_id=4 includes the PCS 350 containing new page composition information, an ODS 355 with the object_id=3, and an END 360. After the graphic processing apparatus 230 stores data corresponding to each segment in the first buffer 233, the second buffer 234, and the page composition buffer 235, the graphic processing apparatus 230 outputs data, which is stored in the second buffer 235, of a completely composed screen to the display device at a time indicated by PTS information of the PCS 350 with the page_id=4.

FIGS. 5A-5D are diagrams illustrating a process of inputting and outputting data to and from the buffers in accordance with a passage of time.

Referring to FIGS. 5A-5D, all of the PCS 305, ODS 310 and 315 and END 320 of the first display set 305 through 320 are stored in the coded data buffer 231 at a time 510 indicated by PTS information included in an MPEG-2 TS header of a pertinent packet, and are output from the coded data buffer 231, decoded in the decoder 232, and stored in the first buffer 233 at time 550 and at time 560 indicated by PTS information of the respective ODSs 310 and 315. As previously explained, a time when one object is output from the coded data buffer 231 theoretically is equal to a time when the object is decoded in the decoder 232 and stored in the first buffer 233. However, in actuality, since time is taken to decode the object, the value of the time 560 indicated by the PTS information of the ODS 315 with the object_id=2 is greater than that of the time 550 indicated by the PTS information of the ODS 310 with the object_id=1.

Accordingly, a first graphic object of the ODS 310 with the object_id=1 is output from the coded data buffer 231 and is decoded and stored in the first buffer 233 at the time 550 indicated by the PTS information of the ODS 310 with the object_id=1. A second graphic object of the ODS 315 with the object_id=2 is output from the coded data buffer 231, and then decoded and stored in the first buffer 233 at the time 560 indicated by the PTS information of the ODS 315 with the object_id=2.

All the PCS 325 and END 330 of the second display set 325 through 330 are stored in the coded data buffer 231 at a time 520 indicated by PTS information included in a header of the pertinent packet. The PCS 325 is decoded in the decoder 232 and stored in the page composition buffer 235. The image controller 236 controls the first buffer 233 to transmit the object necessary to compose the pertinent screen from the first buffer 233 to the second buffer 234 based on the page composition information. A time when the object stored in the first buffer 233 is transmitted to the second buffer 234 and the screen composition starts, is the same as a time indicated by the PTS information of the ODS, which is stored last in the first buffer 233.

However, since the PCS 305 of the first display set 305 through 320 is a dummy PCS with no page composition information, the ODS 315 with the object_id=2, which is stored last, is not transmitted to the second buffer 234 at the time indicated by the PTS information thereof, and not used in the screen composition. When the image controller 236 uses the PCS information of the second display set 325 through 330 which is decoded and stored in the page composition buffer 235, the first graphic object with the object_id=1 and the second graphic object with the object_id=2, which are necessary for the screen composition, are transmitted from the first buffer 233 to the second buffer 234 such that the screen composition starts. At a time 590 indicated by PTS information of the PCS 325 with the page_id=2, the graphic screen data of a completely composed screen is output to the display screen.

All of the PCS 335, ODS 340, and END 345 of the third display set 335 through 345 are stored in the coded data buffer 231 at a time 530 indicated by PTS information included in a header of the pertinent packet and are output from the coded data buffer 231, decoded, and immediately stored in the first buffer 233 at a time 570 indicated by the PTS information of the ODS 340 of the third display set 335 through 345. At this time, since the ODS 340 included in the third display set 335 through 345 has the same object_id=2 as the ODS 315, which has already been stored in the first buffer 233, the ODS 340 overlies the previously stored ODS 315. As a result, an updated object having the object_id=2 is obtained.

However, since the PCS 335 with the page_id=3 performs the screen composition using the ODSs 310 and 340 with the object_id=1 and the object_id=2, the ODS 340 with the object_id=2 is stored last in the first buffer 233 at the time indicated by the PTS information of the ODS 340, and is simultaneously transmitted to the second buffer 234 to be used in the screen composition. At a time 591 indicated by the PTS information of the PCS 335 with the page_id=3, a page of a completely composed screen is output to the display device. At this time, the second buffer 234 maintains a display screen output which is composed based on the page composition information of the PCS 325 with the page_id=2 until the time indicated by the PTS information of the PCS 335 with the page_id=3.

Furthermore, all of the PCS 350, ODS 355, and END 360 of the fourth display set 350 through 360 are stored in the coded data buffer 231 at a time 540 indicated by the PTS information included in a header of the pertinent packet and are output from the coded data buffer 231, decoded, and immediately stored in the first buffer 233 at a time 580 indicated by the PTS information of the ODS 355 of the fourth display set 350 through 360. At a time 592 indicated by the PTS information of the PCS 350 with the page_id=4, a page of a completely composed screen is output to the display device. At this time, the second buffer 234 maintains a display screen output which is composed based on the page composition information of the PCS 335 with the page_id=3 until the time indicated by the PTS information of the PCS 350 with the page_id=4. Accordingly, the second buffer 234 includes a preparing buffer 610 and a display buffer 620 as shown in FIG. 6.

Figure 6:
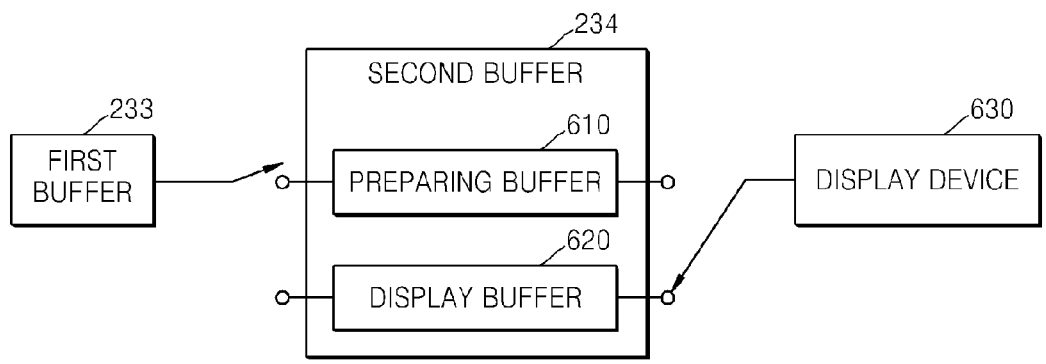
FIG. 6 is a detailed block diagram of a second buffer.

FIG. 6 is a detailed block diagram of the second buffer 234.

Referring to FIG. 6, the second buffer 234 includes the preparing buffer 610 and the display buffer 620. The preparing buffer 610 is a memory used in placing, with reference to the page composition information, objects input from the first buffer 233 at predetermined positions of the display screen. The display buffer 620 is a memory used in displaying data of the prepared display screen. At a time indicated by the PTS information of the PCS 305, 325, 335 and 350, operations of the preparing buffer 610 and the display buffer 620 are exchanged and data of the completely composed screen is finally output to a display device 630.

In further detail with reference to FIGS. 4B and 4C, when the screen composition is completed with reference to the information of the PCS 325 with the page_id=2, contents of the second buffer 234 of FIG. 4B are stored in the display buffer 620, and output to the display device 630. Screen composition proceeds in the preparing buffer 610 with reference to the information of the PCS 325 with the page_id=3. At the time indicated by the PTS information of the PCS 335 with the page_id=3, the operations of the preparing buffer 610 and the display buffer 620 are exchanged such that the contents of the second buffer 234 shown in FIG. 4C are output to the display device 630 and the data of the fourth display set 350 through 360 is input to the preparing buffer 610 in a common manner as described above so as to be used in the screen composition.

Figure 7:
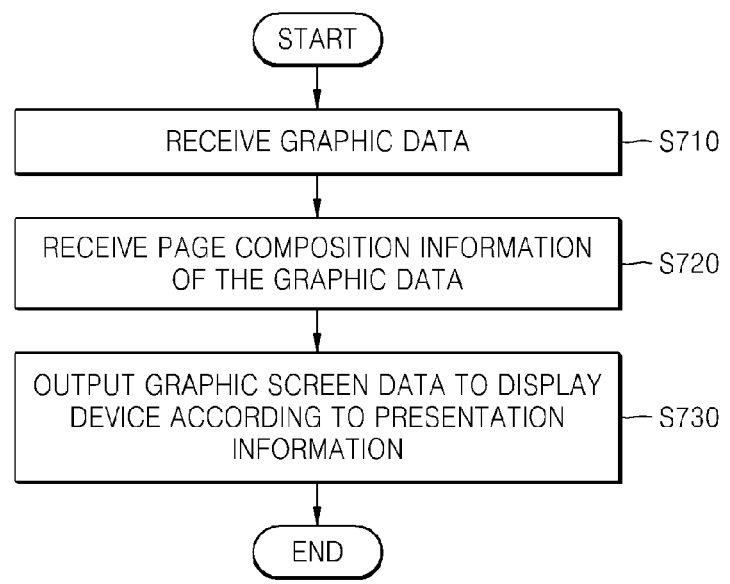
FIG. 7 is a flow chart illustrating a process of outputting graphic display data of a completely composed screen to a display device.

FIG. 7 is a flow chart illustrating an operation of outputting graphic display data of a completely composed page to the display device.

In operation S710, graphic data is received. In operation S720, page composition information which describes a page composition of the graphic data is received. In operation S730, graphic screen data which is composed with reference to the page composition information of the graphic data is output to the display screen according to presentation information which indicates when the graphic screen data is output to the display screen. The presentation information is recorded in a page composition segment including the page composition information. Further, if a plurality of graphic data values exists, a graphic display screen composition starts with reference to the presentation information of a respective one of the graphic data values, among the plurality of graphic data values, that was last input.

Figure 8A:
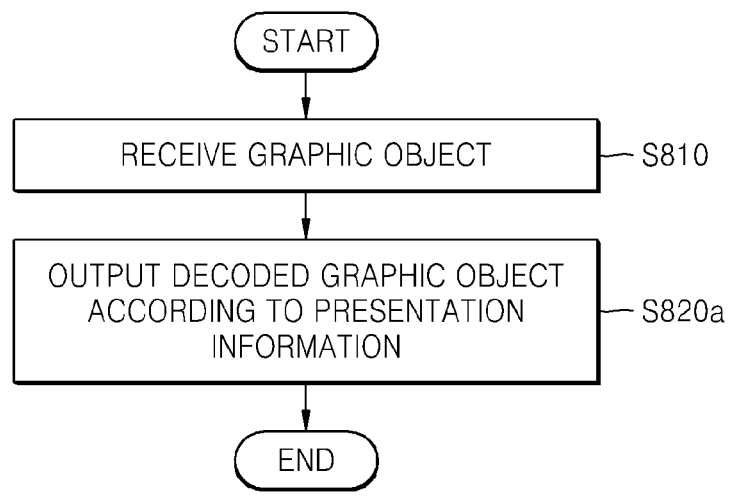
FIG. 8A is a flow chart illustrating a process of outputting a decoded graphic object.

FIG. 8A is a flow chart illustrating an operation of outputting a decoded graphic object.

In operation S810, a graphic object to be used to compose graphic data screen data is received. In operation S820a, a decoded graphic object is output according to presentation information indicating when the graphic object is to be decoded and output.

Figure 8B:
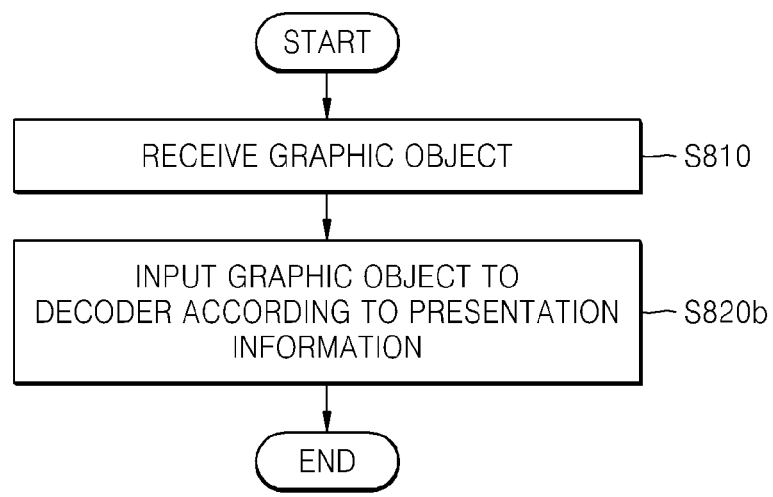
FIG. 8B is a flow chart illustrating a process of inputting the graphic object to a decoder.

FIG. 8B is a flow chart illustrating an operation of inputting a graphic object to the decoder.

In operation S810, a graphic object of which a graphic screen is composed is received. In operation S820b, the graphic object is input to the decoder 232 to be decoded according to presentation information indicating when the graphic object is input to the decoder 232.

In theory, assuming that a decoding time in the decoder 232 is 0, FIGS. 8A and 8B show that a time when the graphic object is input to the decoder 232 is the same as a time when the graphic object is output from the decoder 232. The presentation information is recorded in an object display segment having the graphic object. Thus, according to the invention, if a plurality of graphic objects exist, respective time values indicated by presentation information of the graphic objects have a predetermined time interval therebetween.

This invention may be embodied in a general purpose digital computer by running a program from a computer-readable medium, including but not limited to, storage media such as magnetic storage media (e.g., ROMs, floppy discs, hard discs, etc.), optically readable media (e.g., CD-ROMs, DVDs, etc.), and carrier waves (e.g., transmissions over the Internet). The computer-readable medium may be dispersively installed in a computer system connected to a network, and stored and executed as computer-readable code by a distributed computing environment.

As described above, if graphic data composition information and presentation information are used, a graphic object is reusable during graphic data processing. Accordingly, a time taken to process graphic data is reducible and memory area may be saved.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An apparatus for processing graphic data, the apparatus comprising:
a coded data buffer configured to store coded graphic data;
a first buffer configured to store a plurality of graphic object data each defining a respective graphic object until the first buffer is reset so that the plurality of graphic object data remain available for use until the first buffer is reset, the plurality of graphic object data thereby defining a plurality of graphic objects, the plurality of graphic object data being obtained by decoding the coded graphic data stored in the coded data buffer;
a second buffer configured to store composition information for at least one of the plurality of graphic objects defined by the plurality of graphic object data stored in the first buffer, the composition information specifying how the at least one of the plurality of graphic objects is to be displayed on a display device, the composition information being obtained by decoding the coded graphic data stored in the coded data buffer; and a third buffer configured to store composed graphic data to be output to the display device, the composed graphic data being composed from at least one of the plurality of graphic object data stored in the first buffer.

2. The apparatus of claim 1, wherein each of the plurality of graphic object data is identified by a respective object identifier.

* * * * *